United States Patent
Arita et al.

[11] Patent Number: 5,981,902
[45] Date of Patent: Nov. 9, 1999

[54] TEXTURING APPARATUS FOR MAGNETIC RECORDING MEDIUM AND MAGNETIC RECORDING MEDIUM PROCESS THEREBY

[75] Inventors: Yoji Arita; Yuzo Seo; Toshihiko Kuriyama; Ryuichi Yoshiyama, all of Yokohama, Japan

[73] Assignee: Mitsubishi Chemical Corporation, Tokyo, Japan

[21] Appl. No.: 08/572,333

[22] Filed: Dec. 14, 1995

[30]     Foreign Application Priority Data

| Dec. 15, 1994 | [JP] | Japan | 6-333394 |
| Dec. 15, 1994 | [JP] | Japan | 6-333395 |
| Dec. 15, 1994 | [JP] | Japan | 6-333396 |
| Dec. 15, 1994 | [JP] | Japan | 6-333397 |

[51] Int. Cl.⁶ .............. B23K 26/00; G11B 5/82
[52] U.S. Cl. .............. 219/121.68; 219/121.77; 428/65.3; 428/694 SG
[58] Field of Search ............ 219/121.68, 121.69, 219/121.77, 121.82, 121.61, 121.6, 121.62; 360/135; 427/554, 555, 556; 264/400; 364/474.08; 428/694 SG, 65.3, 65.4

[56]         References Cited

U.S. PATENT DOCUMENTS

| 3,636,251 | 1/1972 | Daly et al. | 219/121.68 |
| 4,015,221 | 3/1977 | Dalton | 219/121.6 |
| 4,335,939 | 6/1982 | Stovell et al. | 219/121.61 |
| 5,062,021 | 10/1991 | Ranjan et al. | 360/135 |
| 5,119,258 | 6/1992 | Tsai et al. | 360/135 |
| 5,120,927 | 6/1992 | Williams et al. | 219/121.68 |
| 5,169,703 | 12/1992 | Miyazaki et al. | 428/694 SG |
| 5,175,504 | 12/1992 | Henley | 219/121.68 |
| 5,279,775 | 1/1994 | Thomas et al. | 219/121.69 |
| 5,283,773 | 2/1994 | Thomas et al. | 360/135 |
| 5,595,791 | 1/1997 | Baumgart et al. | 427/554 |
| 5,599,950 | 2/1997 | Hayashi et al. | 428/694 SG |
| 5,658,475 | 8/1997 | Bareuboim et al. | 219/121.77 |
| 5,768,076 | 6/1998 | Baumgart et al. | 360/135 |

FOREIGN PATENT DOCUMENTS

| 0369784A2 | 5/1990 | European Pat. Off. . |
| 0447025A1 | 9/1991 | European Pat. Off. . |
| 63-126688 | 5/1988 | Japan | 219/121.73 |
| WO9321629 | 10/1993 | WIPO . |

*Primary Examiner*—Geoffrey S. Evans
*Attorney, Agent, or Firm*—David G. Conlin; Richard E. Gamache

[57]            ABSTRACT

A texturing apparatus for applying a texturing to a magnetic recording medium, such as a magnetic disk including a hard drive. A substrate such as a magnetic disk is held by a substrate rotating system, which is capable of rotating the substrate. A movable laser beam source including an electro-optic modulation circuit directs a laser beam through a focusing element onto the surface of the substrate. The modulation circuit allows the laser beam to pulse at a frequency from 0.1 to 100 MHz. The focusing element allows a laser beam spot diameter of 0.2 to 4 $\mu$m on the surface of the substrate. This texturing includes texturing the magnetic head contact start and stop (CSS) area of hard disks.

22 Claims, 5 Drawing Sheets

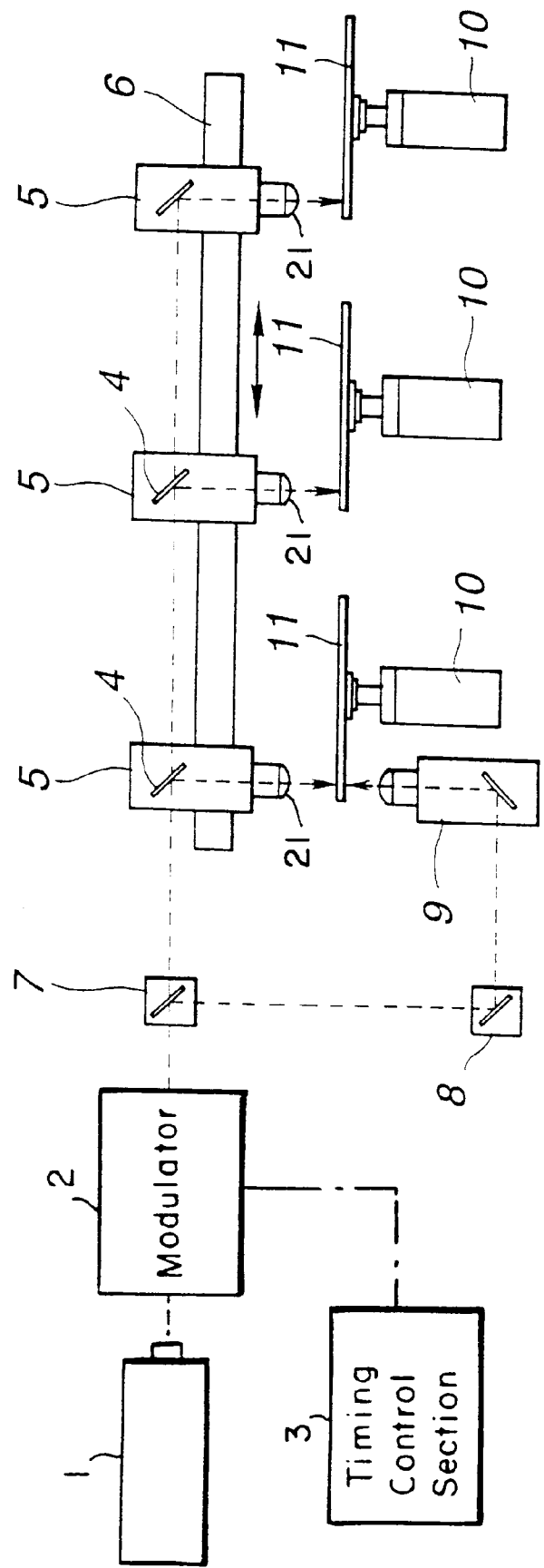

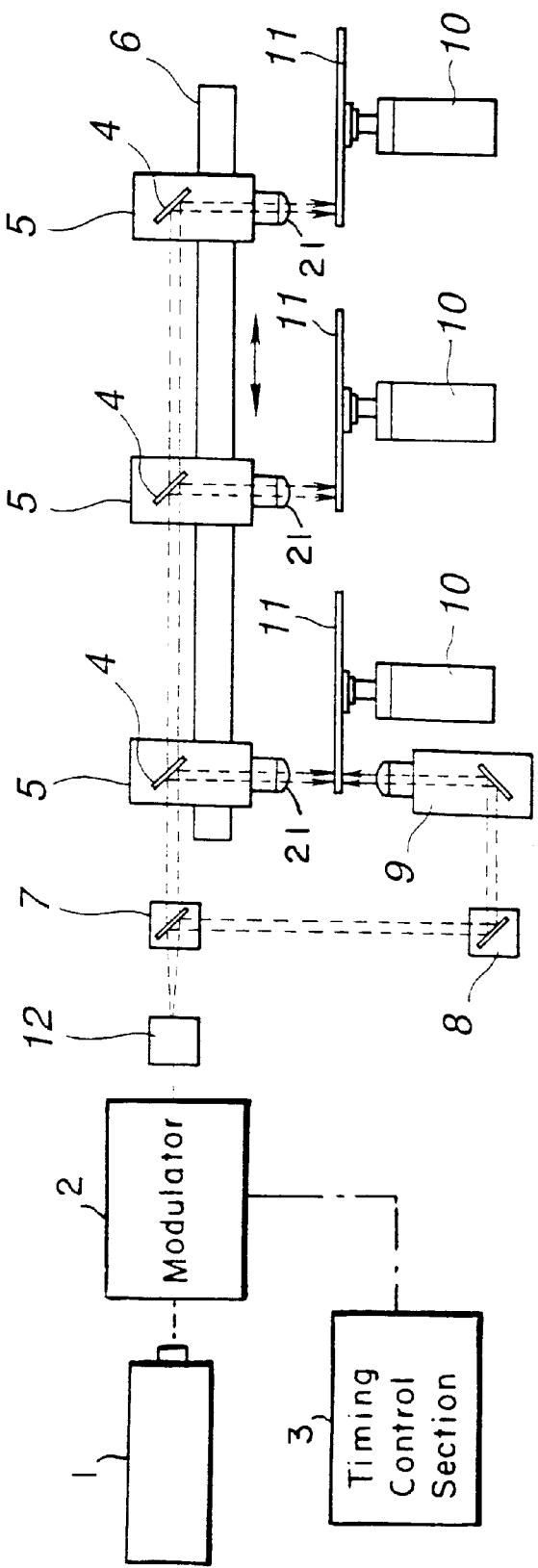

TEXTURING APPARATUS FOR MAGNETIC RECORDING MEDIUM AND MAGNETIC RECORDING MEDIUM PROCESS THEREBY

BACKGROUND OF THE INVENTION

The present invention relates to a texturing apparatus for applying a texturing to a magnetic recording medium (magnetic recording disc) and a magnetic recording medium applied with the texturing, and more specifically, it relates to a texturing apparatus utilizing a laser beam and to a magnetic recording medium formed by using a substrate obtained by the texturing apparatus.

In a magnetic recording disc (hard disk) device for conducting reading/writing operation with a magnetic head rising from a disc, for stably maintaining a minute gap between the head and the disc, a so-called contact start and stop (CSS) system is used in which the magnetic head stops stationary in contact with the surface of the magnetic recording disc during stopping (not reading/writing state), while the magnetic head takes off and flys over the surface of the magnetic recording disc.

In the CSS system, the texturing is usually applied for forming fine traces to a CSS zone to reduce the contacting area between the head and the disc for preventing sticking abrasion or damage of the head.

For the texturing, a mechanical polishing of using a polishing tape coated with grinding particles dispersed in a binder or using a slurry containing polishing grains dispersed therein has been used generally.

However, as the magnetic recording disc device has been miniaturized in recent years, a motor used for the device also tends to be miniaturized in the size and the torque of the motor during driving is lowered as well. Therefore, no sufficient reduction of the contacting area can be obtained by the existent texturing method, so that attraction force of the head to the disc surface during stopping becomes greater than the torque of the motor to bring about a problem of sticking that hinders startings.

In addition, for improving a recording density, a flying height of the head has tended to be lowered, and accompanying therewith, the fabrication with lower and more uniform height has been demanded for texturing applied to the CSS zone.

However, in the existent texturing by mechanical polishing, it becomes difficult to control the uniformity and the fabrication height and can not cope with the recent demand. In view of the above, the texturing utilizing a Q switch YAG laser beam of narrow pulse width and high power is proposed as an alternative method in U.S. Pat. No. 5,062,021. The method disclosed in the said U.S. Pat. No. 5, 062, 021 comprises forming crater-like unevenness projections composed of a hole formed by melting and a circular rim formed therearound by being raised with the surface tension and solidified.

The texturing using the laser beam allows more easy control for the absolute height and the uniformity as compared with the existent mechanical polishing and it is considered to be a promising fabrication method in the future. However, no actual fabrication device has been considered in view of industrial production in the said U.S. Pat. No. 5,062,021.

As a result of the present inventors' earnest studies, it has been found that a magnetic recording medium obtained by using a texturing apparatus comprising: a substrate rotating means which is rotatable while holding a substrate; a laser beam source capable of continuously outputting a laser beam; a modulation means for ON/OFF control of a laser beam from the laser beam source by a pulse frequency from 0.1 to 10 MHz; a focusing means for irradiating a modified laser beam outputted from the modulation means at a spot diameter of 0.2 to 4 μm to the surface of the substrate held by a substrate rotating means; and a moving means for relatively moving the laser beam outputted from the focusing means to the substrate rotating means, has a satisfactory CSS (contact start and stop) characteristic, an excellent sticking property of the magnetic head to the surface of the magnetic recording medium, and is capable of lowering a flying height of the magnetic head. On the basis of the finding, the present invention has been attained.

SUMMARY OF THE INVENTION

An object of the present invention is to provide a texturing apparatus utilizing a laser beam having industrial fabrication productivity.

Another object of the present invention is to provide a texturing apparatus for offering a magnetic recording medium (magnetic recording disc) having excellent CSS characteristics and sticking characteristics.

A further object of the present invention is to provide a texturing apparatus for offering a magnetic recording medium (magnetic recording disc) capable of reducing the flying height of the magnetic head.

A still further object of the present invention is to provide a magnetic recording medium (magnetic recording disc) having excellent CSS characteristics and sticking characteristics, and with low flying height of a magnetic head.

To accomplish the aims, in a first aspect of the present invention, there is provided a texturing apparatus for use in a process for manufacturing a magnetic recording medium (magnetic recording disc), the apparatus comprising:

a substrate rotating means which is rotatable while holding a substrate, a laser beam source capable of continuously outputting a laser beam, a modulation means for ON/OFF control of the laser beam from the laser beam source at a pulse frequency from 0.1 to 10 MHz, a focusing means for irradiating a modified laser beam outputted from the modulation means at a spot diameter of 0.2 to 4 μm to the surface of the substrate held by the substrate rotating means, and a moving means for relatively moving the laser beam outputted from the focusing means and the substrate rotating means.

In a second aspect of the present invention, there is provided a texturing apparatus used in a process for manufacturing a magnetic recording medium (magnetic recording disc), comprising:

a plurality of substrate rotating means for rotating a substrate and capable of rotating at a number of rotation of not less than 1800 rpm, a laser beam source having a power on the irradiated surface of from 50 mw to 2000 mW and capable of continuously outputting a laser beam at a wavelength λ, a modulation means for controlling the laser beam from the laser beam source to ON/OFF at 0.1 to 10 MHz, a beam splitting means for splitting a modulated laser beam outputted from the modulation means into at least two splitted laser beams, a plurality of focusing means corresponding, respectively, to said plurality of splitted laser beams and irradiating each at a spot diameter of 0.2 to 4 μm to the surface of the substrate held by said substrate rotating means, and a moving means for relatively moving the laser beam outputted from s aid plurality of focusing means and said substrate rotating means.

In a third aspect of the present invention, there is provided a texturing apparatus used in a process for manufacturing a magnetic recording medium (magnetic recording disc), comprising:

a substrate rotating means which is rotatable while holding a substrate and an optical system for generating a pulse laser beam having a rising time of not more than 50 ns, a pulse width including the rising time and falling time of from 50 ns to 10 μs and a pulse frequency of from 0.1 to 10 MHz, a focusing means for irradiating the laser beam outputted from an optical system to the surface of the substrate held by said substrate rotating means, and a moving means for relatively moving the laser beam outputted from the focusing means and the substrate rotating means relatively.

In a fourth aspect of the present invention, there is provided a magnetic recording medium (magnetic recording disc) having 10 to $10^8$ N/mm$^2$ of minute projections at a portion of the surface thereof, obtained by using the texturing apparatus defined in the first aspect.

BRIEF DESCRIPTION OF THE DRAWINGS

FIG. 3 is a constitutional view for a main portion of a second embodiment of the texturing apparatus according to the present invention;

FIG. 4 is a constitutional view for a main portion of a third embodiment of the texturing apparatus according to the present invention;

DETAILED DESCRIPTION OF THE INVENTION

Figure 1:
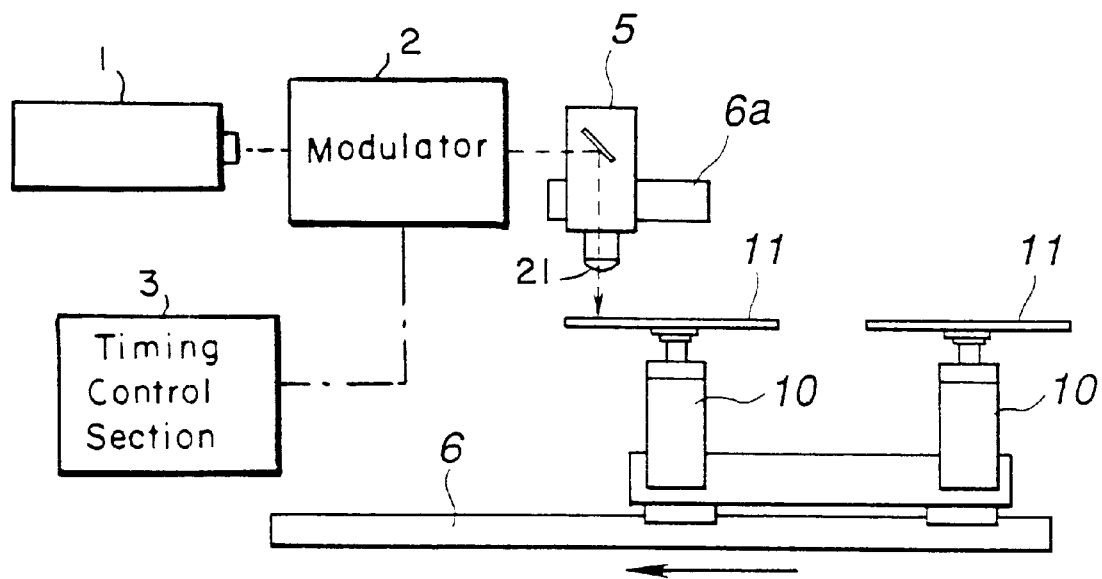
FIG. 1 is a constitutional view for a main portion of a first embodiment of a texturing apparatus according to the present invention.

The present invention is to be explained in more details with reference to the accompanying drawings. FIG. 1 is a constitutional view for a main portion of a first embodiment of the texturing apparatus according to the present invention.

The texturing apparatus according to the present invention is an apparatus for forming minute projections as a texture pattern on the surface of a magnetic recording disc substrate, and in a preferred embodiment, the minute projections are formed each at an equal distance in a CSS zone. As the substrate, there can be mentioned, for example, a substrate formed by conducting an nonelectrolytic plating treatment on the surface of a substrate such as made of an Al alloy, for example, an Al—Mg alloy, to obtain a nonelectrolytic plated Ni—P underlayer and applying mirror finishing (polishing) to the Ni—P underlayer, a glass substrate or a silicon substrate. A substrate made of a metal such as copper or titanium, a carbon substrate, a ceramic substrate or a resin substrate may also be used.

In the following descriptions, such substrates are simply referred as a substrate for the sake of easy explanation. However, the texturing apparatus according to the present invention can be used not only to the substrates described above, but also to substrates during or after disposing an underlying layer, a magnetic layer, a protective layer and a lubricant layer on the substrate, and the substrate referred to herein means substrates in any of such states.

The texturing apparatus comprises substrate rotating mechanisms (10), (10), . . . , a laser beam source (1), a modulator (2) for the ON/OFF control of a laser beam from the beam source (1), a focusing mechanism (5) for irradiating the laser beam from the modulator to the surface of a substrate rotatably supported by the substrate rotating mechanism (10), (10), . . . and a moving mechanism (6) for moving the substrate mechanisms (10), (10), . . . . Although two sets of substrate rotating mechanisms (10) are illustrated in the drawing, any optional number of the mechanisms may be used. From a industrial point of view, it is preferred to use a plurality of the substrate rotating mechanisms in parallel. In this case, a plurality of substrate rotating mechanisms can be moved by one moving mechanism.

The substrate rotating mechanism (10) usually comprises with a spindle motor, and the substrate (11), is supported on a rotational shaft of the spindle motor and rotated at a predetermined number of rotation or linear velocity. The number of rotation, etc. of the substrate is determined in view of productivity, and the number of rotation of the substrate is preferably not less than 900 rpm, more preferably not less than 1800 rpm, still more preferably 3600 to 10000 rpm.

If the rotational shaft of the spindle motor deflects, deflection of plane maybe increased making it difficult to focus the beam, thereby varying the shape of projections and sometimes making it impossible to obtain a desired shape of projections. Accordingly, the deflection of the rotational shaft is preferably within ±25 μm.

As the laser beam source (1), a beam source having a power usually at 50 to 2,000 mW, preferably 50 to 1,000 mW, more preferably 50 to 400 mW on the irradiated surface is used. If the power is less than 50 mW, the formation of projections is difficult. On the other hand, if it exceeds 2,000 mW, it is difficult to apply the texturing that provides excellent CSS characteristics. Further, it is preferred to use a laser capable of being outputted continuously. Referring to the kind of the lasers, a gas laser is preferred. Among all, use of a gas $CO_2$ gas laser, an Ar gas laser or a YAG laser capable of continuous oscillation is preferred, and specifically, an Ar gas laser is used suitably. Since the gas laser has an aligned phase and can easily focus the beam spot as compared with a Q switch YAG laser or an excimer laser, it is advantageous in view of forming a sharp projection shape.

For the laser wavelength, a wave length in a visible region can easily provide higher power. The Ar gas laser beam typically has a wavelength at 488 nm or 514.5 nm. In a case of direct irradiation to a glass substrate, there can be mentioned a laser beam in a UV region of a relatively small power, for example, an argon laser beam at 350 nm or a YAG laser beam at 266 nm passes through FHG (fourth harmonic generator).

The modulator (2) capable of high speed modulation is preferred. Further, a rising time of the pulse is not more than 50 ns (nanosecond), a pulse width including the rising time and a falling time is preferably from 50 ns to 2 μs (microsecond) If the pulse width is less than 50 ns, the projections may not be formed or projections of a desired shape can not be formed easily. On the other hand, if it exceeds 2 μs, the area at the top end of the projection is enlarged tending to lower the CSS characteristics. In addition, it is preferred that the modulator can be put to ON/OFF control upon rising. Since the rising time of the modulator exerts an influence upon the sharpness of the projection, if amodulator of a long rising time is used, projections of a large contacting area with the head are formed.

As a modulatIon device used in such a modulator (2), an electro-optic modulation device (EOM) is preferred. The electro-optic modulation device enables high speed modulation (ON/OFF) up to several hundreds Mbps. Further, it can also conduct analog modulation during the ON state.

The modulation frequency is preferably from 0.1 to 10 MHz, more preferably 0.1 to 5 MHz. If the modulation frequency is less than 0.1 MHz, the contacting area between the projection and the head may be increased. Further, if the frequency exceeds 10 MHz, adjacent projections may interference to each other making it difficult to prepare projections independent of each other. The pulse width [irradiation time necessary for forming one projection=(risingtime)+(time during ON state)+(falling time)] is preferably from 50 ns to 10 μs, more preferably from 50 ns to 2 μs. As the pulse width increases, projections are continued with each other to increase the contacting area with the head.

The focusing mechanism (5) comprises a combination at least of a total reflector and an objective lens. Also, it is preferred for forming a sharp spot to extend a beam diameter to an effective diameter of the objective lens by providing a beam expand between the total reflector and the objective lens. Generally, the effective diameter of the objective lens is about 50% to about 80% of the objective lens diameter.

Since the purpose of the texturing apparatus according to the present invention is to produce the minute projections uniformly, the absolute value of diameter, the uniformity and the sharpness of the laser beam irradiated to the substrate are important factors. The spot diameter is preferably from 0.2 to 4 μm, more preferably from 0.2 to 2 μm. The spot diameter represents the diameter of a circle in which the intensity of light is reduced to "$e^{1/2}$" of the maximum intensity at the central portion of the beam. In addition, it is preferred that NA is from 0.3 to 0.8 and λ/NA is from 0.16 to 3.3 assuming the numerical aperture of the objective lens as NA and the wavelength of the laser beam as λ.

Figure 6:
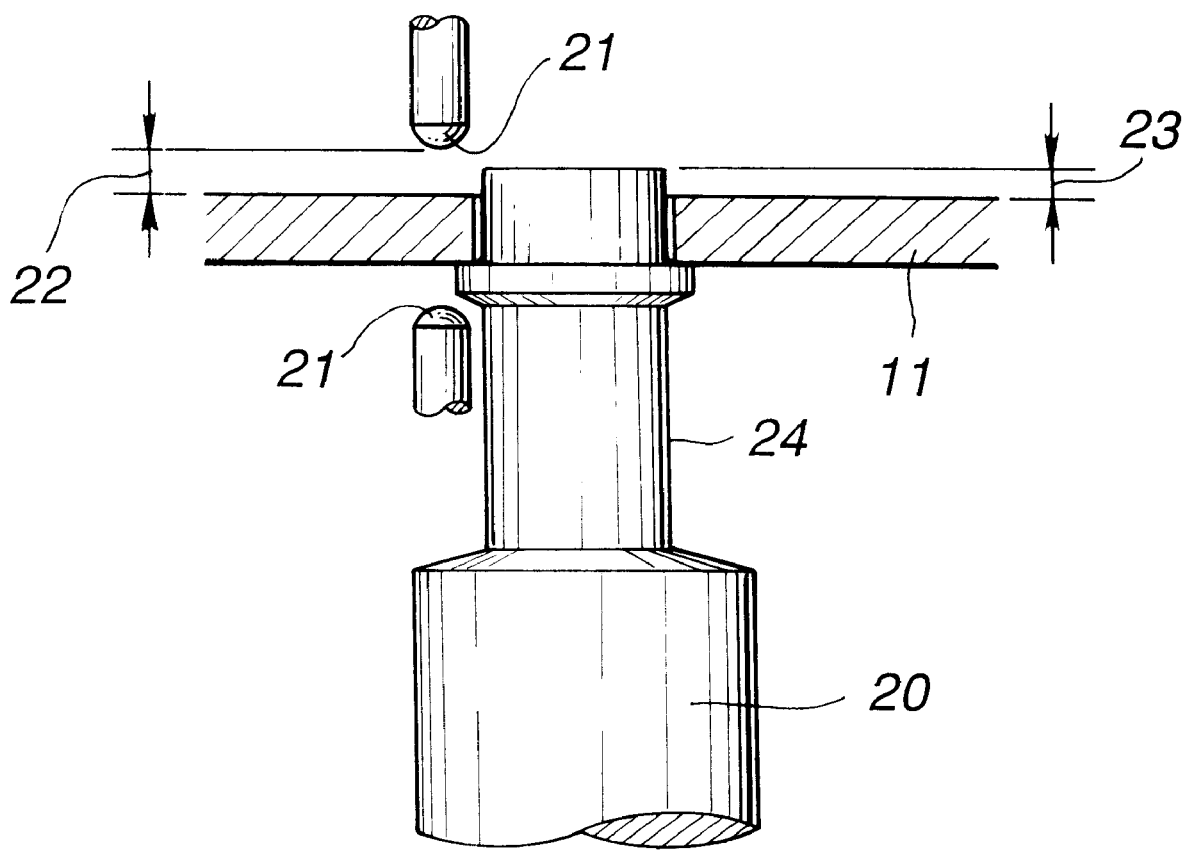
FIG. 6 is a view for the arrangement of a substrate and an objective lens in a focusing mechanism upon applying texturing by using the texturing apparatus according to the present invention.

In view of the sharpness of the spot, the focal distance of the objective lens is preferably not more than 20 mm, more preferably not more than 5 mm. In such a case, since the substrate and the objective lens are disposed closely adjacent with each other, it is necessary that they have such a shape enough to enable stable attaching/detaching and rotation, as well as high speed rotation of the substrate, and not to hinder the moving motion of the objective lens. That is, as shown in FIG. 6, it is preferred that the top end of the rotational shaft of the spindle (20) extends from the surface of the substrate such that the ratio of the distance (23) between the upper surface of the substrate and the top end of the rotational shaft relative to the distance (22) (working distance) between the upper surface of the substrate and the objective lens (21) is not more than 0.8, more preferably not more than 0.6. The working distance is usually not more than 10 mm, preferably 200 μm to 10 mm.

In addition, it is preferred to provide a small diameter portion (recess) (24) to the rotational shaft of the spindle in the vicinity of the rear face of the substrate for compensating the stable movement of the objective lens.

Use of an aspherical objective lens is preferred since this reduces the weight of the lens, improves the light transmittance and extends the working distance.

Since the distance between the objective lens and the substrate varies depending, for example, on the undulation of the substrate or the deflection of the spindle shaft, it is preferred that the focusing mechanism further has an automatic focusing (AF) mechanism for maintaining the spot diameter constant. It is more preferred that the autofocusing mechanism has a response frequency of not less than 90 Hz. If the response frequency is lowered, the size of the beam spot varies making the size and the height of the projection not uniform. In addition, it is preferred to provide the AF mechanism with a learning function for deflection of plane, that is, to utilize actual results in the past of the AF control at the laser irradiated portion to AF control by synchronizing with the rotation of the disc, for example, in a feed forward manner, thereby improving the control efficiency.

As the moving mechanism (6), a linear slider or the like can be used suitably. An example of moving the substrate rotating mechanism (10) is illustrated in FIG. 1 as a method of moving the focusing mechanism (5) and the substrate rotating mechanism (10) relatively. That is, a plurality of substrate rotating mechanism (10), (10), . . . , are mounted on one linear slider (6). The plurality of the substrate rotating mechanism (10), (10), . . . reciprocate below the focusing mechanism (5) at a constant speed. The relative moving velocity between the focusing mechanism and the substrate is determined within such a preferred range that the CSS characteristics are satisfactory, since it is difficult to improve the CSS characteristics in case where the relative moving speed is too slow, whereas the contacting area between the projection and the head is enlarged in case where the relative speed is too fast. Usually, the relative scanning speed on the beam irradiation surface is set to not less than 2 m/s, preferably 2 to 50 m/s.

Figure 2:
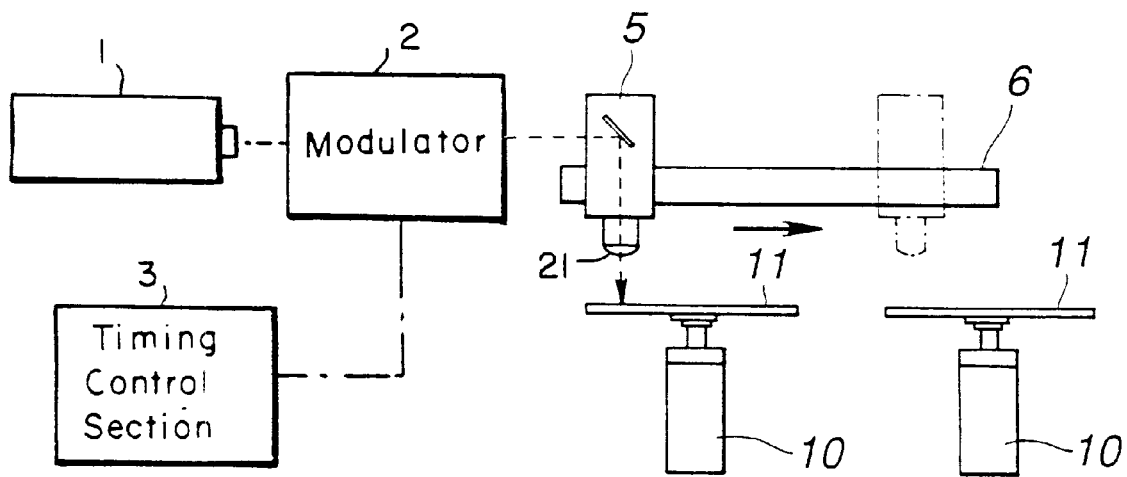
FIG. 2 is a view showing another embodiment having the same constitution as shown in FIG. 1.

Alternatively, as other constitution for relatively moving the substrate rotating mechanism (10) and the focusing mechanism (5), a constitution for moving the focusing mechanism (5) shown in FIG. 2 may be used or a combination of the afore-mentioned constitutions may be used.

Referring to FIG. 1, the moving mechanism (6) can be moved at a necessary low speed over the entire process for applying texturing to each of the plurality of substrates (11), (11), . . . but usually, the mechanism is moved at an increased speed upon moving from one substrate (11) to a next substrate (11). Then, such speed control can also be conducted by mounting another moving mechanism on the moving mechanism (6), and the movement between the substrates can be conducted by one of the mechanisms and the movement for texturing can be conducted by the other of them. In a case of utilizing the moving mechanism (6) only for moving from one substrate (11) to the next substrate (11), it is necessary to use other moving mechanism (6a) that carries the focusing mechanism (5) thereon and to apply texturing to one substrate (11) by the movement of the mechanism (6a) .The linear slider mentioned above can be used suitably also for the moving mechanism (6a).

The texturing apparatus according to the present invention comprises a timing control section (3) for controlling the modulation timing of the laser beam as a means for forming minute projections on the surface of the substrate in a predetermined pattern of identical or different pitch. For example, when minute projections are formed each at an identical pitch as usually used, in case where the substrate (11) is moved at a constant number of rotation and a constant speed by the constant speed operation of the moving mechanism (6) and the substrate rotating mechanism (10), the pitch of the minute projections formed on the surface of the substrate is made wider toward the outer circumference. Then, the position for the substrate is confirmed by the timing control section (3) and the modulation timing for the laser beam (irradiation time) is controlled by the signal, thereby making the pitch of the minute particles formed on the surface of the substrate constant.

The timing control section (3) comprises, for example, a computer, a position detection mechanism, a necessary interface, etc. As the position detection mechanism, a laser displacement gauge, an encoder or the like can be used. Instead of controlling the modulation timing of the laser beam, the speed of the moving mechanism (6) and the substrate rotating mechanism (10) may be controlled.

For forming the uniform shape of the projections, it is preferred that the sweeping distance of the laser spot accompanying with the relative movement of the focusing mechanism and the substrate rotating mechanism become to fix, in case of varying the radius of the inner periphery and the outer periphery of the disc substrate, that is, varying a certain position at the radius direction. In such a case, it is preferred to change the pulse width or a number of rotation of the substrate in proportion of the irradiation position.

Example of the main construction of the texturing apparatus is set forth below.

In the apparatus having a fixed number of rotation of the spindle, the apparatus comprises an instrument means for measuring the position of the laser spot at the radius direction, a pulse width arithmetic means for fixing the sweep distance of the laser spot relative to each position at the radius direction measured by the instrument means, and a modulation means of the laser beam on the basis of the arithmetic results. Also, in the apparatus having a fixed plus width, the apparatus comprises an instrument means for measuring the position at the radius direction, a rotation number arithmetic means for fixing the sweep distance of the laser spot relative to each position at the radius direction measured by the instrument means, and a varying means of the rotation number on the basis of the arithmetic results.

FIG. 3 is a constitutional view for a main portion illustrating a second embodiment according to the present invention. Identical constitutional components as those in FIG. 1 are represented by the same reference numerals. In this embodiment, a modulated laser beam outputted from a modulation means (2) is split by a beam splitter (4 or 7), and split beams are individually supplied to separate focusing mechanisms respectively, thereby making it possible for simultaneous texturing to a plurality of regions of the substrates (11). In FIG. 3, moving means for the lower focusing means (9) is not illustrated. Further, in this embodiment, a plurality of focusing means (5) are provided and a beam splitter (4) is used at the inside of each of the focusing means (5) instead of the total reflector in FIG. 1.

That is, in this embodiment, the laser beam from one optical source can be supplied to a plurality of focusing means respectively by using the beam splitter (4) at the inside of the focusing means (5). Accordingly, the texturing can be applied simultaneously to a plurality of substrates.

Further, it is also possible to apply the texturing simultaneously on both surfaces of the substrate by the combination of the beam splitter (7) and a total reflector (8). It is, of course, possible to constitutes the lower focusing means (9) identical with that in other focusing means (5), so that a plurality of lower focusing means are provided.

As the beam splitter (4, 7) in this embodiment, a so-called beam splitter cube can be used in which two orthogonal right angle prism are used and they are joined at opposed oblique sides to each other with a semi-transparent film being coated on one of the oblique sides. Then, the amount of the laser beam irradiated to each of the substrates can be conditioned constant by using a plurality of laser beam splitters of different splitting ratios.

Further, in this embodiment, one timing control section (3) is provided for fabricating both surfaces of the substrate (11) at an identical radial position, but the regions and the substrates can be fabricated independently of each other by providing a plurality of timing control sections (3).

FIG. 4 is a constitutional view for a main portion illustrating a third embodiment according to the present invention. Identical constitutional components with those in FIGS. 1 and 2 are represented by the same reference numerals. This embodiment has a constitution in which a deflector (12) is disposed just before the beam splitter (7) in the constitution shown in FIG. 3.

When a laser beam is deflected by the deflector (12) in this constitution, the beam can be caused to scan on the substrate (11) without moving the focusing means (5).

The focusing means (5) has a large moving per one unit time and it is possible to drive sinusoidally the deflecting means in the radius direction. In such a case, it is also possible to elevate the density of the projections at the radius direction without raising the number of rotation of the spindle.

Figure 5A:
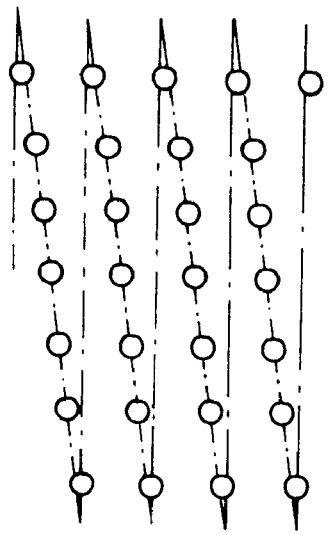
FIG. 5 is a view showing examples of textured patterns obtained by the constitution shown in FIG. 4.
Figure 5B:
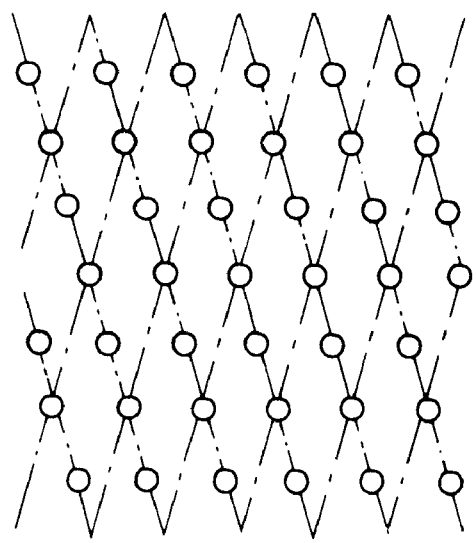

FIG. 5a and FIG. 5b show examples of texture patterns which can be formed by using the deflector (12).

As the deflector (12) in this embodiment, an acoustic optic deflector, electro-optic deflector (AOD, EOD) is suitably used, for instance.

FIG. 4 shows an example in which the deflector (12) is added to the constitution shown in FIG. 3 and it is also possible for such a constitution in which the deflector (12) is added to the constitution shown in FIG. 1.

Operation of the texturing apparatus described above is to be explained with reference to FIG. 1. The operation can of course be automated by a control device not illustrated.

At first, substrates (11), (11), . . . are set, respectively, to a plurality of substrate rotating mechanisms (10), (10), . . . , and the substrates (11) are rotated at a constant speed. Then, a laser beam from the laser beam source (1) is converted into a pulse beam by the modulator (2), passed through the focusing mechanism (5), and then irradiated through the focusing mechanism (5) to the surfaces of the substrates (11), (11), . . . on the plurality of substrate rotating mechanisms (10), (10), . . . which are moved at a constant speed by the moving mechanism (6). That is, each of the substrates (11), (11), . . . is moved continuously to conduct texturing to a plurality of substrates continuously.

According to the texturing apparatus of the present invention, minute projections each at a height of 1 to 100 nm and of a shape comprising a convex and a concave in the vicinity of and contiguous with the convex can be formed by the number of 10 to $10^8$ N/mm$^2$ (Numbers/mm$^2$). Among all, relatively sharp projections each having an average value of not more than 1 $\mu$m$^2$ for an area of a graphical shape surrounded with a contour line at a height −1 nm below the top end of each of the projections can be obtained. As a result, a magnetic recording disc substrate can be obtained having satisfactory CSS characteristics and sticking characteristics, and capable of reducing the flying height of the magnetic head as well.

EXAMPLES

The CSS characteristics of magnetic recording discs obtained by the texturing apparatus according to the invention are to be shown.

Example 1

In the texturing apparatus comprising the constitution shown in FIG. 1, texturing was applied on one surface of a substrate under the following conditions.

Laser beam source: Ar gas laser beam tube (wavelength: 488 nm, maximum power: 2 W)
Modulator: Electro-optic modulator (response frequency: 2 MHz, rising time: 15 ns)
Laser beam power: 400 mw
 Pulse width: 0.156 $\mu$sec
 Beam spot diameter: 1 $\mu$m
 Autofocus response frequency: 180 Hz
Number of rotation of substrate: 3600 rpm
Moving speed of linear slider (relative speed): 0.9 mm/sec
Relative beam scanning speed on the irradiated surface: 7.2 m/s
Substrate: Nonelectolytic Ni—P plating layer was formed to a thickness of 15 $\mu$m on the surface of a disc-shaped Al alloy substrate of 95 mm in diameter and then surface polished so as to provide a surface roughness (Ra) of not more than 1 nm.
Deflection of the rotational shaft: ±$\mu$m As a result of observing the shape of the substrate after texturing by a surface shape measuring device utilizing interference ("ZYGO", manufactured by Zygo Co. in U.S.A), it was confirmed that minute projections each of a shape comprising a convex and a concave in adjacent with and contiguous with the convex was formed. Further, the average projection density was 9260 N/mm$^2$, the average projection height was 33 nm, and the average value for the area of the graphic shape surrounded with a contour line at a height 1 nm below the top end (hereinafter referred to as "A area") was 0.12 $\mu$m$^2$.

A Cr intermediate layer (100 nm in thickness), a Co—Cr—Ta alloy magnetic layer (50 nm in thickness) and a carbon protective layer (20 nm in thickness) were formed successively on the surface of the substrate as described above by a sputtering method , and a fluro-type liquid lubrican t ("DOL-2000", manufactured by Montedison S.p.A) was dipcoated to the surface of the carbon protective layer, to obtain a magnetic recording disc.

For the magnetic recording disc described above, stationary friction coefficient before a CSS test (initial sticktion) and frictional force after 20,000 cycles of CSS were measured. The CSS test was conducted by using a thin film head of 6 gf load gram (slider made of Al$_2$O$_3$TiC) and under the condition of a head flying height of 2 $\mu$inch. Further, a stable flying height of the head upon seeking between the data zone and the CSS zone was evaluated by using a glide tester. The initial sticktion was 0.18, the frictional force after 20,000 cycles of CSS was 3 gf, and the stable flying height of the head was 1.5 $\mu$inch.

Example 2

Texturing was applied by using the constitution shown in FIG. 2 in the same procedures as those in Example 1 except for using the following conditions:

Laser beam power: 200 mw
 Pulse width: 0.312 $\mu$sec
 Beam spot diameter: 1 $\mu$m
 Autofocus response frequency: 180 Hz
 Number of rotation of substrate: 1800 rpm
 Moving speed of linear slider: 0.3 mm/sec
 Relative beam scanning speed: 3.6 m/s As a result of observing the shape of the substrate after texturing by a surface shape measuring device utilizing interference ("ZYGO", manufactured by Zygo Co. in U.S.A), it was confirmed that minute projections each of a shape comprising a convex and a concave in adjacent with and contiguous with the convex were formed. Further, the average projection density was 9260 N/mm$^2$, the average projection height was 29 nm and the "A area" was 0.2 $\mu$m$^2$.

A magnetic recording disc was produced in the same procedures as those in Example 1, and stationary friction coefficient before CSS test (initial sticktion) and frictional force after 20,000 cycles of CSS were measured. The CSS test was conducted by using a thin film head of 6 gf load gram (slider made of Al$_2$O$_3$TiC) and under the condition of a head flying height of 2 $\mu$inch. Further, a stable flying height of the head upon seeking between the data zone and the CSS zone was evaluated by using a glide tester. The initial sticktion was 0.17, the frictional force after 20,000 cycles of CSS was 4 gf, and the stable flying height of the head was 1.5 $\mu$inch.

Example 3

In the constitution shown in FIG. 3, the beam splitter 7 was not used. Two focusing mechanisms 5 were used, one of the focusing mechanisms (on the side of the light source) composed of a combination of a beam splitter cube and an objective lens, and the other focusing mechanism comprised a combination of the total reflector and the objective lens as in Example 1. As the beam splitter 4, a beam splitter cube was used.

Then, texturing was conducted in the same manner as in Example 1 except for changing the moving speed of the linear slider (relative speed) to 0.6 mm/sec, the relative scanning speed of the beam to 4.8 m/s and the number of rotation of the substrate to 2400 rpm.

As a result of observing the surface shape of the substrate after texturing by a surface shape measuring device utilizing interference ("ZYGO", manufactured by Zygo Co. in U.S.A), it was confirmed that minute projections each of a shape comprising a convex and a concave in adjacent with and contiguous with the convex were formed. Further, the average projection density was 9260 N/mm$^2$, the average projection height was 33 nm, and "A area" was 0.12 $\mu$m$^2$.

For the magnetic recording disc obtained by disposing the magnetic layer or the like as in Example 1, stationary friction coefficient before CSS test (initial sticktion) and frictional force after 20,000 cycles of CSS were measured. The CSS test was conducted by using a thin film head of 6 gf load gram (slider made of Al$_2$O$_3$TiC) and under the condition of a head flying height of 2 $\mu$inch. Further, a stable flying height of the head upon seeking between the data zone and the CSS zone was evaluated by using a glide tester. The initial sticktion was 0.18, the frictional force after 20,000 cycles of CSS was 3 gf, and the stable flying height of the head was 1.5 $\mu$inch.

Example 4

The same constitution as in Example 3 was used except for disposing a deflector between the modulator and the first focusing mechanism. AOD was used as the deflector. Texturing was applied in the same manner as in Example 1 except for using the following conditions.

Pulse width: 0.234 μsec

Deflection speed: 64 mm/sec

Number of rotation of substrate: 3600 rpm

Moving speed of linear slider: 0.6 mm/sec

As a result of observing the surface shape of the substrate after texturing by a surface shape measuring device utilizing interference ("ZYGO", manufactured by Zygo Co. in U.S.A), it was confirmed that minute projections each of a shape comprising a convex and a concave in adjacent with and contiguous with the convex were formed. Further, the average projection density was 9260 N/mm$^2$, the average projection height was 40 nm, and the "A area" was 0.1 μm$^2$.

A magnetic recording disc was obtained by using the resultant substrate in the same manner as in Example 1. For the magnetic recording disc described above, stationary friction coefficient before CSS test (initial sticktion) and frictional force after 20,000 cycles of CSS were measured. The CSS test was conducted by using a thin film head of 6 gf load gram (slider made of Al$_2$O$_3$TiC) and under the condition of a head flying height of 2 μinch. Further, a stable flying height of the head upon seeking between the data zone and the CSS zone was evaluated by using a glide tester. The initial sticktion was 0.19, the frictional force after 20,000 cycles of the CSS test was 3 gf, and the stable flying height of the head was 1.5 μinch.

Example 5

Texturing was applied in the same manner as in Example 1 except for using the following conditions:

Laser beam power: 300 mw

Pulse width: 0.1 μsec

As a result of observing the surface shape of the substrate after texturing by a surface shape measuring device utilizing interference ("ZYGO", manufactured by Zygo Co. in U.S.A), it was confirmed that minute projections each of a shape comprising a convex and a concave in adjacent with and contiguous with the convex were formed. Further, the average projection density was 10000 N/mm$^2$, the average projection height was 31 nm, and the "A area" was 0.12 μm$^2$.

A magnetic recording disc was obtained by using the resultant substrate in the same manner as in Example 1. For the magnetic recording disc described above, stationary friction coefficient before CSS test (initial sticktion) and frictional force after 20,000 cycles of CSS were measured. The CSS test was conducted by using a thin film head of 6 gf load gram (slider made of Al$_2$O$_3$TiC) and under the condition of a head flying height of 2 μinch. Further, a stable flying height of the head upon seeking between the data zone and the CSS zone was evaluated by using a glide tester. The initial sticktion was 0.3, the frictional force after 20,000 cycles of CSS was 8 gf, and the stable flying height of the head was 1.5 μinch.

Comparative Example 1

Texturing was applied in the same manner as in Example 5 except for changing the conditions as:

Modulator: acousto-optic modulator (rising time: 200 ns)

Pulse width: 0.5 μsec

As a result of observing the shape of the surface of the substrate after texturing by a surface shape measuring device utilizing laser interference ("ZYGO", manufactured by Zygo Co. in U.S.A), the average projection density was 10,000 N/mm$^2$, the average projection height was 10 nm and the A area was 1.1 μm$^2$.

A magnetic recording disc was obtained by using the resultant substrate in the same manner as in Example 1. For the magnetic recording disc, static friction coefficient before CSS test (initial sticktion) and friction force after 20,000 cycles of CSS were measured. The CSS test was conducted by using a thin film head of 6 gf load gram (slider material: Al$_2$O$_3$TiC) and under the condition of a head flying height of 2 μinch. Further, the stable flying height of the head during seeking between the data zone and the CSS zone was evaluated by using a glide tester. The initial sticktion was 1.8 and absorption occurred after 12,000 cycles of CSS.

Comparative Example 2

Texturing was applied in the same manner as in Example 1 except for changing the response frequency of the auto-focusing mechanism to 50 Hz.

As a result of observing the shape of the surface of the substrate after texturing by a surface shape measuring device utilizing laser interference ("ZYGO", manufactured by Zygo Co. in U.S.A), the average projection height was 10,000 N/mm$^2$, the average projection height was 23 nm and the A area was from 0.12 to 1.1 μm$^2$, and the projection height varied between 10 to 35 nm.

A magnetic recording disc was obtained by using the resultant substrate in the same manner as in Example 1. For the magnetic recording disc, static friction coefficient before the CSS test (initial sticktion) and friction force after 20,000 cycles of CSS were measured. The CSS test was conducted by using a thin film head of 6 gf load gram (slider material: Al$_2$O$_3$TiC) and under the condition of a head flying height of 2 μinch. Further, the stable flying height of the head during seeking between the data zone and the CSS zone was evaluated by using a glide tester. The initial sticktion was 0.9, the frictional force after 20,000 cycles of CSS was 25 gf and the stable flying height of the head was 1.5 μinch.

Comparative Example 3

Texturing was applied in the same manner as in Example 5 except for changing the response frequency of the auto-focusing mechanism to 50 Hz, but melting by the laser irradiation did not occur on the surface of the substrate and projections were not formed.

What is claimed is:

1. A texturing apparatus used in a process for manufacturing a magnetic recording medium, comprising:

a substrate rotating means which is rotatable while holding a substrate, a laser beam source capable of continuously outputting a laser beam, an electro-optic modulation means for ON/OFF control of a laser beam from the laser beam source by a pulse frequency from 0.1 to 10 MHz, a focusing means for irradiating a modified laser beam outputted from the modulation means at a spot diameter of 0.2 to 4 μm to the surface of the substrate held by a substrate rotating means, and a moving means for relatively moving the laser beam outputted from the focusing means and the substrate rotating means.

2. A texturing apparatus according to claim 1, wherein said substrate rotating means rotate the substrate at a number of rotation of not less than 1800 rpm.

3. A texturing apparatus according to claim 1, wherein the power of said laser beam source at the irradiated surface is from 50 mW to 2000 mW.

4. A texturing apparatus according to claim 1, in which a plurality of said substrate rotating means are provided.

5. A texturing apparatus according to claim 1, wherein said focusing means has an autofocusing means with a response frequency of not less than 90 Hz.

6. A texturing apparatus according to claim 5, wherein said autofocusing means has a learning function.

7. A texturing apparatus according to claim 1, wherein said focusing means has an objective lens and satisfies the following formula:

$$0.16 \leq \lambda/NA \leq 3.30$$

wherein NA represents a numerical aperture.

8. A texturing apparatus according to claim 1, wherein said focusing means have an objective lens, and the focal distance of said objective lens is not more than 20 mm.

9. A texturing apparatus according to claim 1, wherein said moving means move said laser beam and said substrate rotating means at a relative speed within a range from 0.03 to 60 mm/sec.

10. A texturing apparatus according to claim 1, wherein the wavelength $\lambda$ of said laser beam is within a visible range.

11. A texturing apparatus according to claim 1, wherein said substrate rotating means has a spindle motor for rotating the substrate and the deflection of a rotational axis of the spindle motor is within ±25 $\mu$m.

12. A texturing apparatus according to claim 1, wherein a deflection means is further disposed between said modulation means, and said focusing means for deflecting the modulation laser beam and supplying the same to the focusing means.

13. A texturing apparatus according to claim 1, wherein a timing control signal generation means is further provided for controlling at least one of the modulation timing for the modulation means, the rotational speed for the substrate rotating mechanism and the moving speed of the moving means, and supplying a control signal for controlling the pitch of the projections on the substrate.

14. A magnetic recording medium, which has 10 to $10^8$ projections, each having an average value of not more than 1 $\mu$m$^2$ for an area of graphical shape surrounded with a contour line at a height 1 nm below the top end of each projection, at a portion of the surface thereof, and is obtained by using said texturing apparatus as defined in the claim 1.

15. A magnetic recording medium according to claim 14, wherein the height of said projections is from 1 to 100 nm.

16. A texturing apparatus used in a process for manufacturing a magnetic recording medium, comprising:

a plurality of substrate rotating means for rotating a substrate and capable of rotating at a number of rotation of not less than 1800 rpm, a laser beam source having a power on the irradiated surface of from 50 mW to 2000 mW and capable of continuously outputting a laser beam at a wavelength $\lambda$, an electro-optic modulation means for controlling the laser beam from the laser beam source to ON/OFF at 0.1 to 10 MHz, a beam splitting means for splitting a modulated laser beam outputted from the modulation means into at least two splitted laser beams, a plurality of focusing means corresponding, respectively, to said plurality of splitted laser beams and irradiating them each at a spot diameter of 0.2 to 4 $\mu$m to the surface of the substrate held by said substrate rotating means, and a moving means for relatively moving the laser beam outputted from said plurality of focusing means and said substrate rotating means.

17. A texturing apparatus used in a process for manufacturing a magnetic recording medium, comprising:

a substrate rotating means which is rotatable while holding a substrate and an optical system having an electro-optic modulation means for generating a pulse laser beam having a rising time of not more than 50 ns, a pulse width including the rising time and falling time of from 50 ns to 10 $\mu$s and a pulse frequency of from 0.1 to 10 MHz, a focusing means f or irradiating the user beam outputted from an optical system to the surface of the substrate held by said substrate rotating means, and a moving means for relatively moving the laser beam outputted from the focusing means and the substrate rotating means relatively.

18. A texturing apparatus according to claim 17, wherein said laser beam source is a laser beam source capable of continuously outputting power, and focusing means has capability focusing the spot diameter from 0.2 to 4 $\mu$m on the substrate.

19. A texturing apparatus used in a process for manufacturing a magnetic recording medium, comprising:

a substrate rotating means which is rotatable at a number of rotation of not less than 1800 rpm while holding a substrate, a laser beam source capable of continuously outputting a laser beam at the irradiated surface from 50 mW to 2000 mw, an electro-optic modulation means for ON/OFF control of a laser beam from the laser beam source by a pulse frequency from 0.1 to 10 MHz, a focusing means for irradiating a modified laser beam outputted from the modulation means at a spot diameter of 0.2 to 4 $\mu$m to the surface of the substrate held by a substrate rotating means, and a moving means for relatively moving the laser beam outputted from the focusing means and the substrate rotating means.

20. A texturing apparatus used in a process for manufacturing a magnetic recording medians, comprising:

a substrate rotating means which is rotatable while holding a substrate, a laser beam source capable of continuously outputting a laser beam, a modulation means for ON/OFF control of a laser beam from the laser beam source by a pulse frequency from 0.1 to 10 MHz, a focusing means for irradiating a modified laser beam outputted from the modulation at a spot diameter of 0.2 to 4 $\mu$m to the surface of the substrate held by a substrate rotating means, which focusing means has an autofocusing means with a response frequency of not less than 90 Hz, which has a learning function, and a moving means for relatively moving the laser beam outputted from the focusing means and the substrate rotating means.

21. A texturing apparatus used in a process for manufacturing a magnetic recording medium, comprising:

a substrate rotating means which is rotatable while holding a substrate, a laser beam source capable of continuously outputting a laser beam, a modulation means for ON/OFF control of a laser beam from the laser beam source by a pulse frequency from 0.1 to 10 MHz, a focusing means for irradiating a modified laser beam outputted from the modulation means at a spot diameter of 0.2 to 4 μm to the surface of the substrate held by a substrate rotating means, which focusing means has an objective lens and satisfies the following formula:

$$0.16 \leq \lambda/NA \leq 3.30$$

wherein NA represents a numerical aperture, and a moving means for relatively moving the laser beam outputted from the focusing means and the substrate rotating means.

22. A texturing apparatus used in a process for manufacturing a magnetic recording medium, comprising:

a substrate rotating means which is rotatable while holding a substrate, a laser beam source capable of continuously outputting a laser beam, a modulation means for ON/OFF control of a laser beam from the laser beam source by a pulse frequency from 0.1 to 10 MHz, a focusing means for irradiating a modified laser beam outputted from the modulation means at a spot diameter of 0.2 to 4 μm to the surface of the substrate held by a substrate rotating means, which focusing means have an objective lens, and the focal distance of said objective lens is not more than 20 mm, and a moving means for relatively moving the laser beam outputted from the focusing means and the substrate rotating means.

* * * * *